Jan. 30, 1962   R. P. PARHAM   3,018,857
PORTABLE HUNTING BLIND
Filed March 25, 1959   6 Sheets-Sheet 2
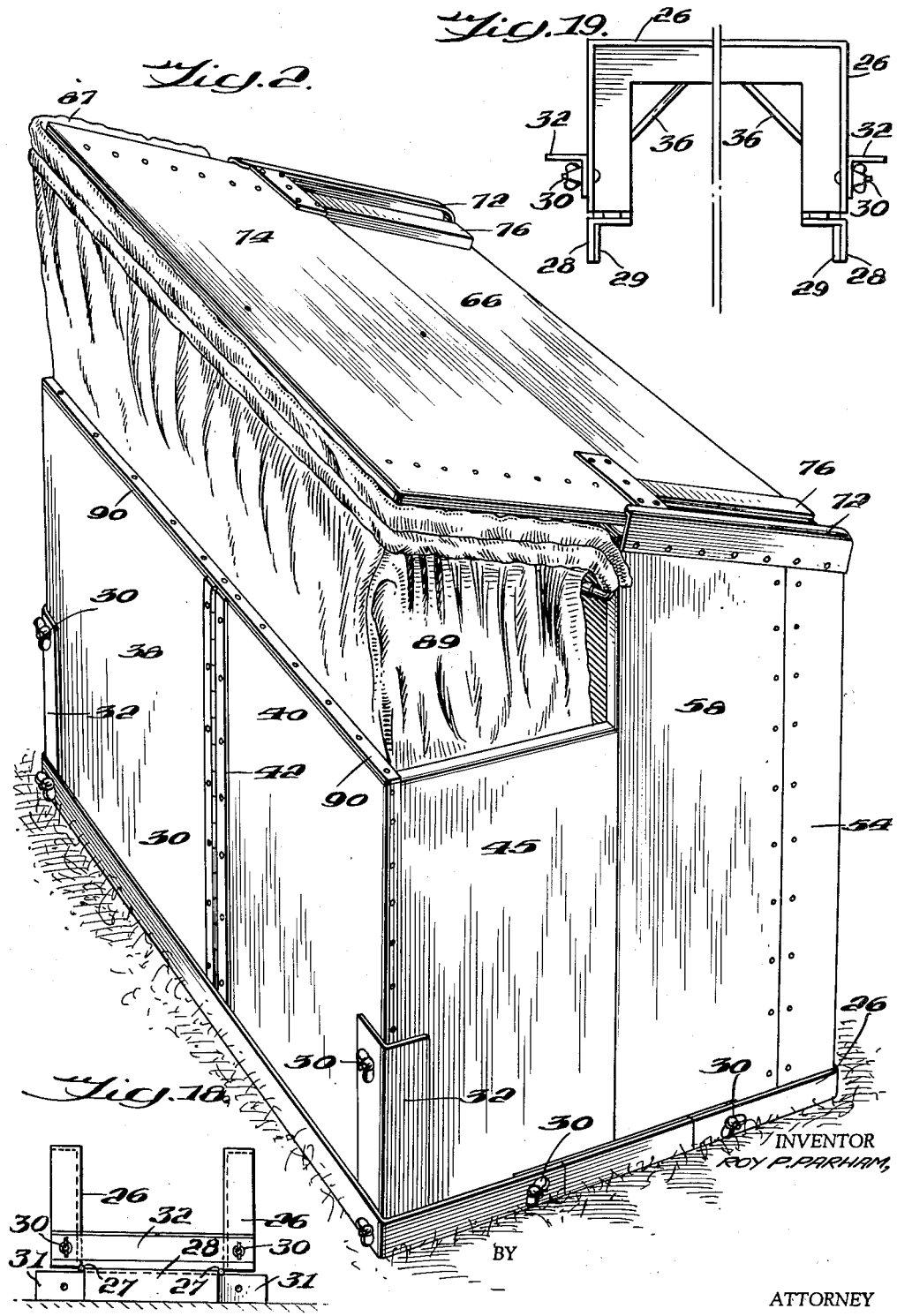

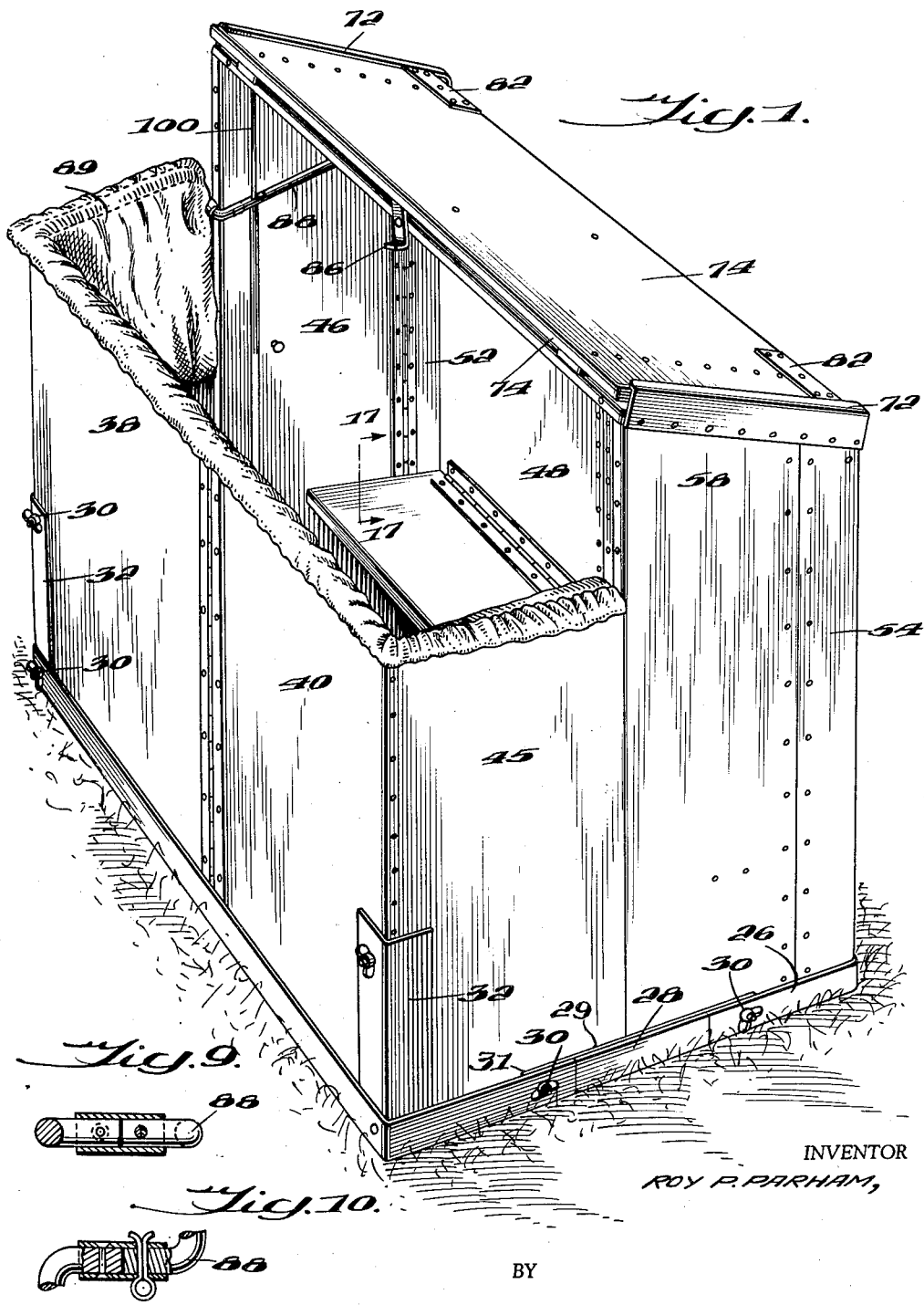

Jan. 30, 1962 R. P. PARHAM 3,018,857
PORTABLE HUNTING BLIND
Filed March 25, 1959 6 Sheets-Sheet 3
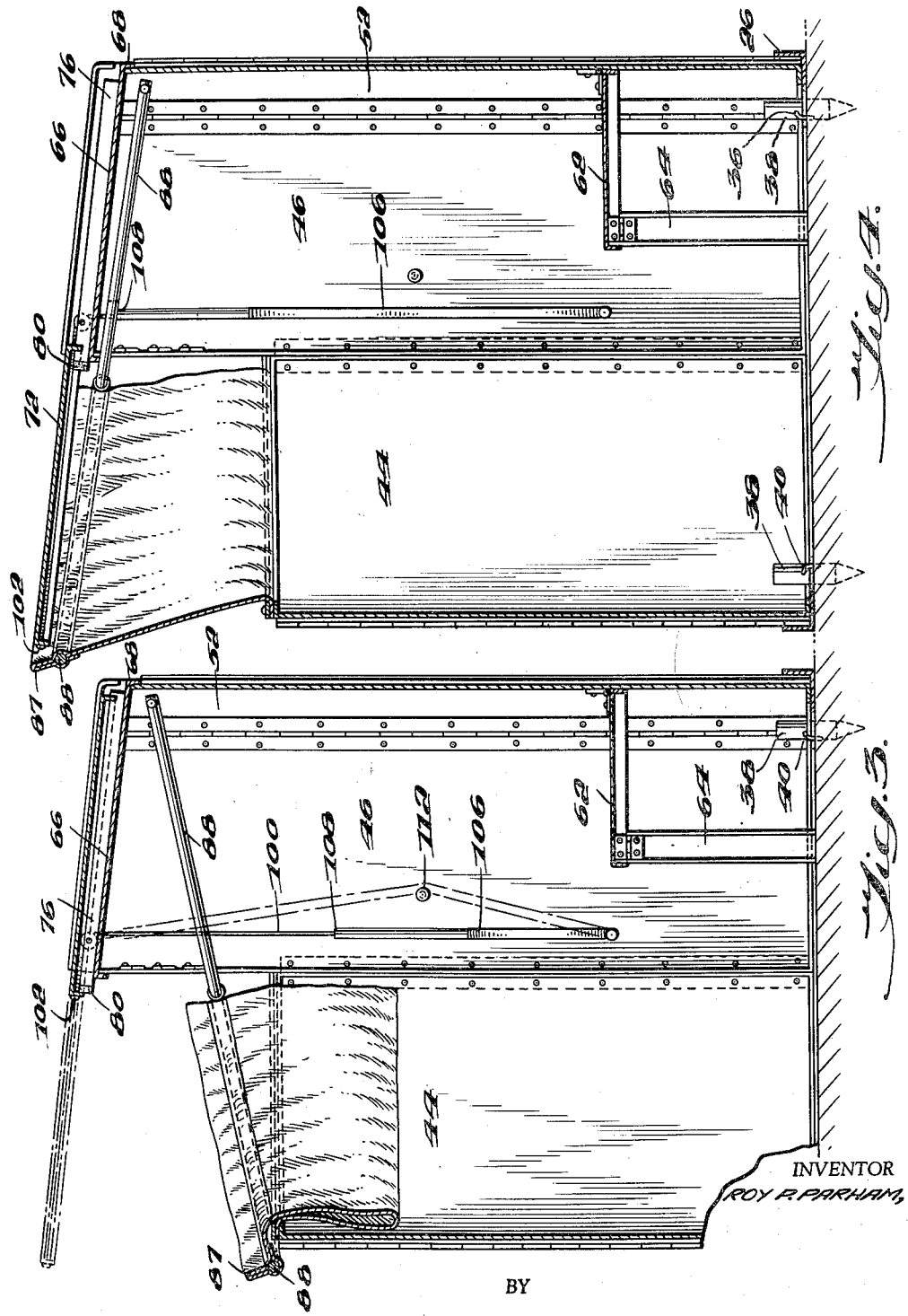
INVENTOR
ROY P. PARHAM,
BY
ATTORNEY

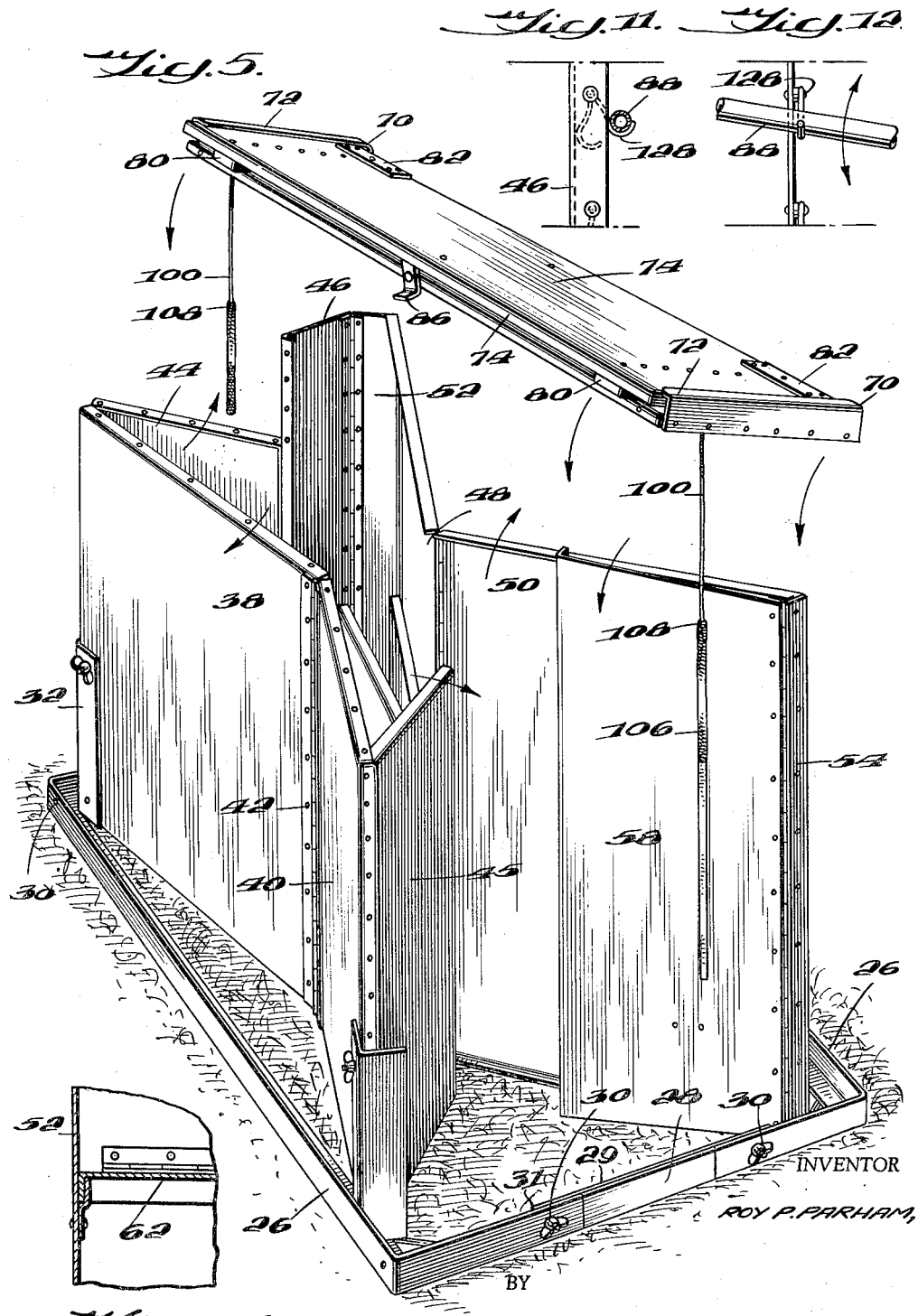

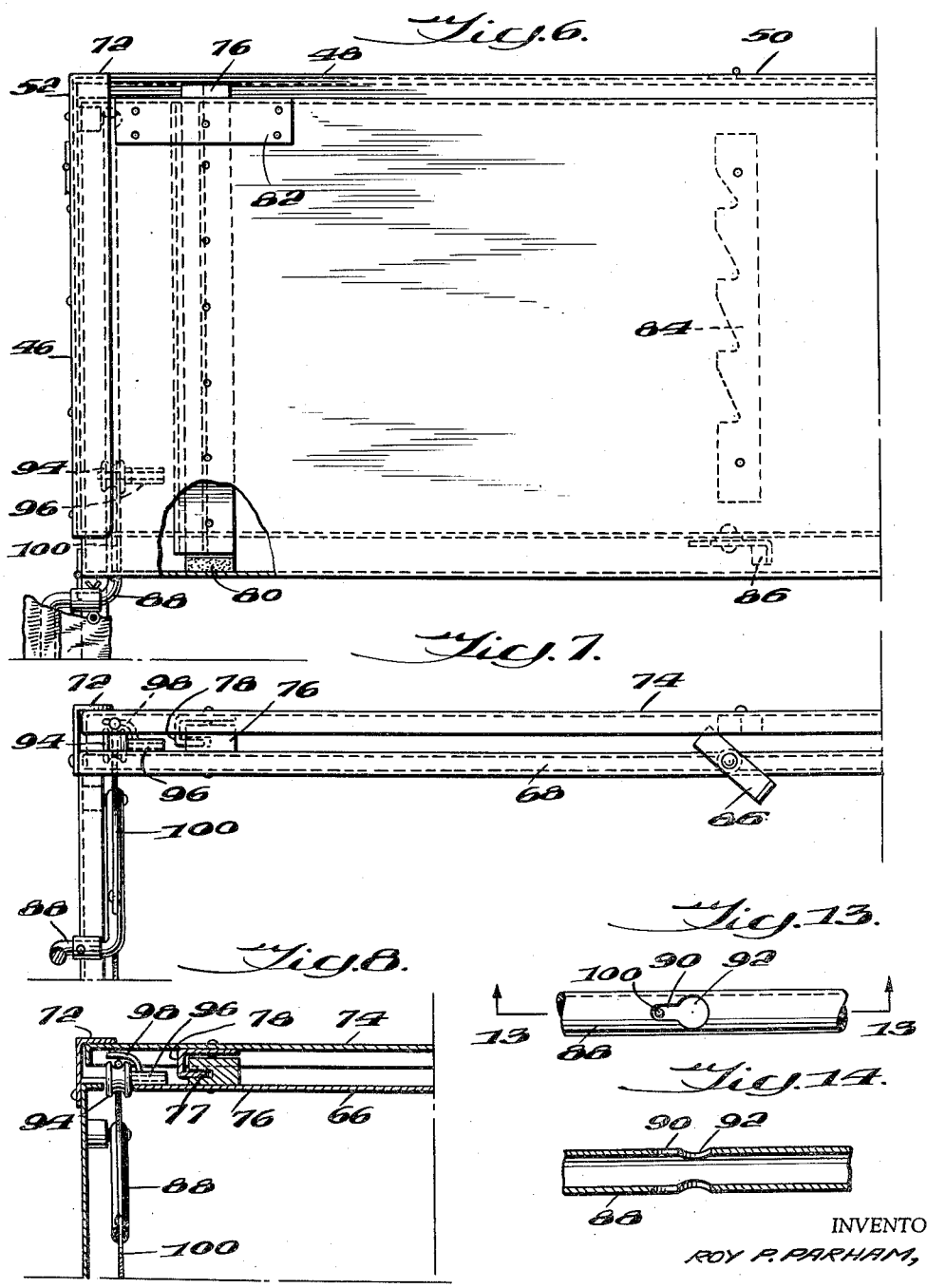

Jan. 30, 1962 R. P. PARHAM 3,018,857
PORTABLE HUNTING BLIND
Filed March 25, 1959 6 Sheets-Sheet 6
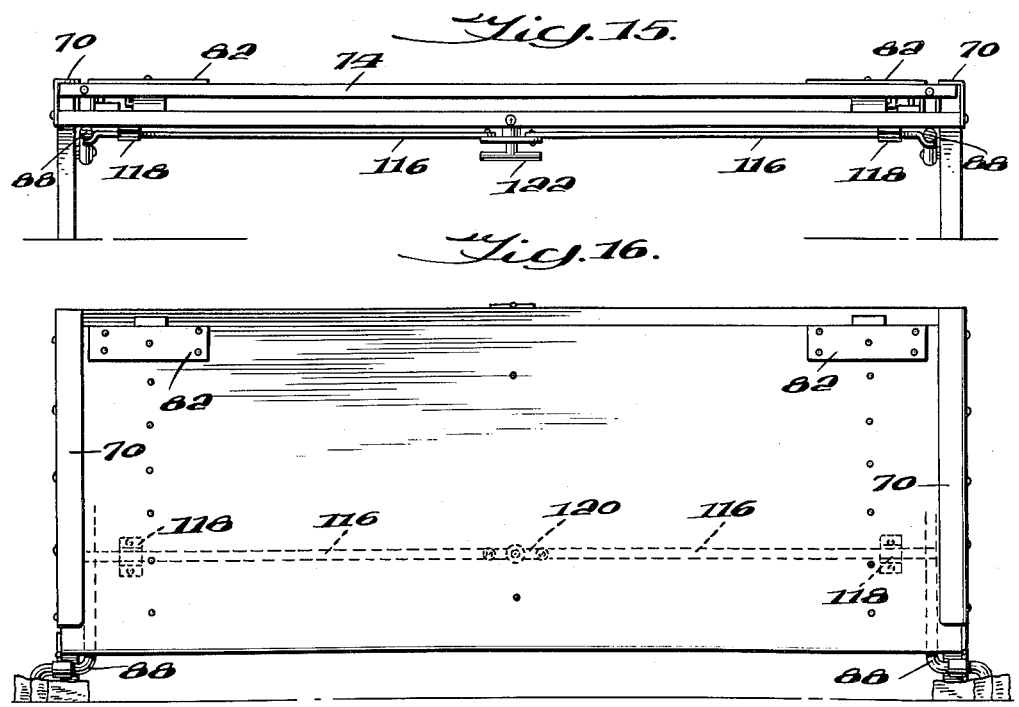
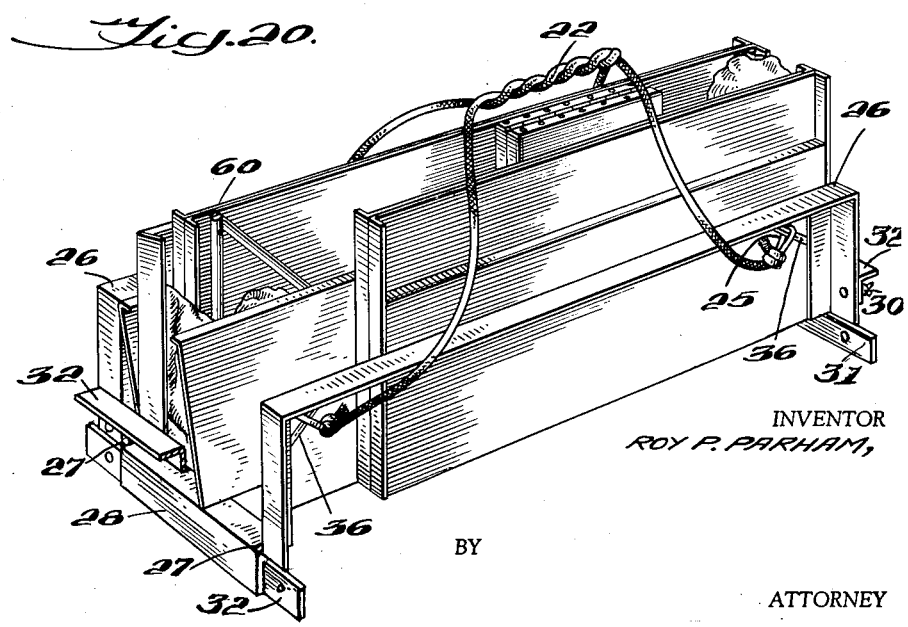
INVENTOR
ROY P. PARHAM,
BY
ATTORNEY

United States Patent Office 3,018,857
Patented Jan. 30, 1962

3,018,857
PORTABLE HUNTING BLIND
Roy P. Parham, 303 NE. 60th St., Oklahoma City, Okla.
Filed Mar. 25, 1959, Ser. No. 801,816
10 Claims. (Cl. 189—2)

The present invention relates to hunting blinds and more particularly to the portable type of hunting blind which can be easily carried or transported to and from the hunting site.

One of the objects of the present invention is to provide a hunting blind having component parts which can be quickly erected, and also subsequently folded or collapsed into a novel compact portable carrying package.

Another object of the invention is to provide a comfortable portable hunting blind especially adapted for duck hunting which will provide camouflaged cover for the hunters and is constructed in a novel manner to permit and command a shooting area up to 360°.

A further object of the invention is to provide a light weight portable duck hunting blind having a novelly constructed slidable roof structure and a cooperating movable curtain operable by the hunter in different positions to completely camouflage, conceal and cover the hunter; or to permit of a horizontal shooting area up to 180° with the hunter being covered from above; or to permit of a horizontal shooting area up to 360° and at the same time a shooting area above the hunter of substantially 180° in all directions; or to completely or partially enclose the hunter on all sides with a portion of the roof of the blind being opened or closed.

A further important object of the invention will be found to reside in the novel structure and component parts, several of the same having twofold uses, one in the erected position and the other in the collapsed or portable form of the blind providing a structure of relatively few parts which is simple, easy and quick to erect and then subsequently may be folded into a compact light weight portable carrying package which can be readily carried and transported in the average automobile.

And a still further important object of the invention is to provide a foldable portable duck hunting blind which when in its erected hunting position is adapted to comfortably accommodate one or two hunters, the height, the width, and the relative angle of the roof and the novel position of the foldable seats therein being such as to permit of the hunters upon a slight forward bending of the trunk portions of their bodies, to arise from a comfortable sitting position to an upright shooting position in one movement thereof.

The accompanying drawings and this specification, as well as the claimed subject matter, disclose the invention as preferred and embodied at this time for understanding the problems sought to be solved in portable duck hunting blinds. Since the teachings herein may suggest changes to others who wish to avail themselves of the benefits of the invention, it will be appreciated that subsequent modifications hereof may well be equivalent in form and hence the same in spirit and principle as this disclosure.

By way of introduction, it is pointed out that the official patent drawings herein are made from a model specimen and are scaled proportionately thereto, for an understanding of the size and space relationship of the parts—the simple operation of erection, and the subsequent compactness of the portable form.

In the accompanying drawings, wherein for the purpose of illustration there is shown a preferred embodiment of the invention:

FIG. 1 is a perspective view of the portable blind when erected, showing the slidable roof section in its retracted position and the movable curtain section of the blind completely lowered, affording the hunter or hunters a 360° horizontal shooting area from above;

FIG. 2 is a perspective view of the portable duck hunting blind in its erected form, showing the slidable roof section in its extended position and the pivotal curtain section in its raised position for completely enclosing, concealing and camouflaging the hunters therein;

FIG. 3 is a vertical sectional view of FIG. 1, showing the foldable seats and also the manner in which the base may be removably fixed to the ground;

FIG. 4 is a vertical sectional view of FIG. 2;

FIG. 5 is an exploded perspective view showing the foldable base portion of the blind in its extended erected position on the ground or the like with the hingedly connected panels of the end and side sections arranged upright therein, the arrows indicating the simple manner in which the hingedly connected panels are pushed outwardly to form the erected sides and ends of the blind for subsequent attachment to the bottom base and the securing of the roof and the pivotally mounted curtain sections thereto;

FIG. 6 is a partial top plan view illustrating the manner in which the curtain frame arms are pivotally mounted on the inner panels of the erected blind and in detail showing the resilient abutting stops for the retractable roof section;

FIG. 7 is a front elevational view partly in section of FIG. 6;

FIG. 8 is a partial vertical sectional view of the roof shown in FIG. 6 showing in detail the manner in which the pulley and curtain frame arms are mounted;

FIGS. 9 and 10 are detail sectional views of the curtain frame inner arms as shown in FIG. 1 illustrating one type of structure for pivotally connecting and breaking the arm sections of the curtain frame and for holding them in their extended erected position;

FIG. 11 is a fragmentary front elevational view partly in section showing in detail the spacedly disposed pivotally mounted hooks or catches which hold the curtain frame arms in different upright positions;

FIG. 12 is a side view of FIG. 11 showing the arm of the curtain frame held in one position in the hooks;

FIG. 13 is a top view of a portion of the curtain frame inner arm showing the relatively narrow slot formed therein which merges with a larger opening through which the curtain frame operating cord extends for raising the curtain and also permitting of the frame not only to be held in different elevated positions but permitting of a free wheeling operation of the retractable roof section therewith;

FIG. 14 is a longitudinal sectional view of FIG. 13, taken on lines 13—13 looking in the direction of the arrows;

FIG. 15 is a partial front elevational view showing the operating mechanism for releasably holding the curtain frame in its highest closed position;

FIG. 16 is a partial elevational view of the roof structure showing the slidable roof section in its retracted position;

FIG. 17 is a vertical sectional view of the foldable seats taken on line 17 of FIG. 1, looking in the direction of the arrows;

FIG. 18 is an end view of the angle iron supporting base structure in which the pivotally mounted side portions are positioned upwardly to define the carrying frame for receiving the other folded sections of the blind and for holding the same in position therein in the transportable package form of the hunting blind;

FIG. 19 is a side elevation of the angle iron supporting base with the sections thereof positioned as shown in FIG. 18; and FIG. 20 is a perspective view of the portable carrying package form of the blind illustrating the two-fold use of some of the component parts and also the novel manner in which the flexible handle is removably secured to its carrying frame.

In the accompanying drawings wherein for the purpose of illustration there is shown a preferred embodiment of the invention and in which corresponding parts are designated by similar reference characters, FIG. 20, generally shows the invention in its folded portable form embodying a light weight package of such size that it can be easily carried by means of the removable flexible handle 22, and if so desired placed in an automobile for transportation to and from the hunting site.

Referring now to FIG. 5 of the drawings, there is shown an exploded perspective view of the hunting blind, the component parts of which have been removed from their carrying frame. The base portion is of rectangular shape when in its extended erected position and is constructed of angle iron. The base includes two similar U-shaped side members 26 which are pivotally secured at their free ends by hinge means 27 to intermediate connecting angle members 28. It will thus be seen that when the U-shaped sides 26 are in their extended positions a rectangular shaped angle iron base is provided for the blind. The pivotally mounted U-shaped sides 26 are held in their flat extended position by means of a flat bar 29 which is secured to the inner face of the vertical leg of the angle member 28 and extends out beyond the ends thereof, as shown at 31, and the wing bolt and nut combinations 30.

As seen in FIG. 20, the base structure also has a two-fold use, namely when the U-shaped sides 26 thereof are moved upward to their vertical positions with respect to the intermediate members 28, they may be tied together and held in this position by means of the removable corner angle members 32. These corner angle members 32 have spaced holes therein to accommodate the same wing nut and bolt combination 30 which were used when the U shaped sides were extended to form the base of the erected blind.

It will thus be apparent that when the sides 26 as previously described are secured in their upright vertical positions as shown in FIG. 20, a carrying frame for the other parts of the blind is formed. Diagonal struts 36 are welded or otherwise secured across each inner corner portion of the U-shaped members 26 and they serve as a connecting member for the snap connectors 25 of the flexible handle 22. As shown in FIGURES 3 and 4, the struts 36 in each inside corner of the U-shaped members 26 also have a dual function, namely to serve in cooperation with the pegs 38 and their depending anchor pins 40 to hold the U-shaped members in their extended position and firmly secure the base of the blind to the ground in any site selected for the erection of the blind.

As clearly shown in FIG. 5, the side and end walls including the door of the blind comprise a plurality of hingedly connected and foldable panels which may be constructed of sheet metal or any other suitable material. The front wall of the blind is made up of two vertically disposed panels 38 and 40 which are hingedly connected together at their abutting vertical edges for relative swinging by means of a piano hinge 42 or the like. A door 45 is hingedly connected adjacent the free vertical edge of the panel 40 for inward swinging movement in a vertical plane thereof. To the free vertical end of the panel 38 there is hingedly connected for vertical pivotal movement one of the panels 44 of the left side wall of the blind. This side wall includes two vertical panels 44 and 46. The panels 44 and 46 are hingedly connected at their vertical edges for swinging movement in a vertical plane. The rear wall of the blind is made up of two vertically disposed panels 48 and 50 which are hingedly connected at their inner vertical juxtaposed edges for inner vertical swinging movement. The vertical outer end portions of each of the panels 48 and 50 are bent inwardly at right angles to the plane of the panels as at 52 and 54 providing right angle corners which fit snugly in the respective inner corners of the base. The free vertical end of the panel 46 is hingedly connected to the free vertical end of the inwardly right angularly bent portion 52 of the panel 48. The other end wall of the blind comprises the inwardly swingable door 45 and the vertical panel 58 which is hingedly connected to the right angularly inwardly bent portion 54 of the panel 50. The panels 46 and 58 as clearly shown in FIG. 1 extend upwardly beyond the upper edge of the panel 44 and the door 45 and have their upper edges inclined rearwardly.

It will thus become apparent from the foregoing description of the hingedly connected panels, that the same may be folded upon themselves into a nested compact package generally designated by the reference character 60, which snugly fits into the carrying frame.

It will be observed that this folded panel package arrangement also facilitates the erection of the blind in that after the removal of the folded panel package from its carrying frame and the setting up of the carrying frame as a base for the blind as previously described, the folded panels may be placed vertically within the base as shown in FIG. 5 and by the simple outward pushing of the panels and door as shown by the arrows, the lower portions of the panels are moved into abutting relation with the ends and sides of the angle iron base to form the side and end walls of the blind. The lower ends of the panels are flanged inwardly, spacedly drilled and removably secured to the base by bolt and nut combinations or the like.

The front corners of the erected blind are firmly held in position by means of the corner angles 32 and the same nut and wing bolt combination 30 that was used when the corner angle 32 provided a tie member for the upright U-shaped sides 26 of the carrying frame.

As shown in FIGS. 1 and 3 and in detail in FIG. 17, seats 62 are hingedly connected to the inner sides of panels 48 and 50. They are provided with hingedly mounted legs 64, which are foldable against the lower side of the seat, the seat being adapted to be folded upwardly into abutment with its panel support.

After the panels are unfolded and the sides and end walls of the blind are erected and secured to the base, the removable roof section or top is placed upon and over the rear portion of the blind as shown in FIG. 1. It will be observed at this point that the vertical panels 38, 40, 44 and the door 45 forming the front portion of the blind are all of the same height. The roof receiving panels 46, 48, 50 and 58 extend above the height of the other panels so that together with the width of the door 45 and the panel 44 the top edge of the front portion of the blind is in spaced relation and lower than the leading edge of the roof when the roof is in its retracted position providing a novel shooting opening.

The blind is adapted to accommodate one or two hunters and the height of the roof section and the arrangement of the seats on the rear panels are such that when the hunters are in a seated position they are comfortable without their heads abutting the roof. It is also at this time important to note that the distance between the front and rear walls of the blind, the angle of rearward slant of the roof and the size of the shooting opening are such that a hunter, when seated, need only bend the trunk portion of his body forward, raise up and the upper portion of his body and arms extend upwardly through the shooting opening. The height of the panels forming the front portion of the blind are such that their upper edges terminate just below the arm level when the hunter is in position for shooting in a horizontal area. This type of a shooting opening provides for a horizontal shooting area to the front of 180°, a horizontal shooting area over the roof of the blind to the rear of 180° and a complete coverage of the shooting area above the blind.

The removable roof as clearly illustrated in FIGS. 2 and 5 and more in detail in FIGS. 6, 7 and 8, comprises a removable rectangular shaped panel 66 of sheet metal or the like having downwardly extending flange portions 68 around its perimeter which are placed upon the top of the panels 46 and 58 in the erected position to fit tightly against the panels and hold the roof thereon. Angle iron ends 70 are secured to each free end of the roof panel 66, the inwardly extending flange portions 72 of the angle members 70 are disposed in spaced relation to the upper side of the panel 66 defining guideways for the slidable roof section 74. Inwardly of each end of the panel 66 there is secured on the upper surface thereof a transversely disposed block 76. These blocks are provided with longitudinally extending grooves forming a guide slot in which there is slidable one arm 77 of a transversely disposed U-shaped guide member 78 secured to the inner side of the slidable roof section 74. It will be seen that this enables the roof section 74 to be freely slidable between its guideways and also firmly held in extended positions with respect to the roof panel. A resilient block 80 is secured to each forward end of the grooved blocks to cushion the impact of the slidable roof section when it is quickly retracted thus eliminating unnecessary noise which might frighten the ducks. Stop members 82 are secured to the upper surface of the slidable roof section adjacent each rear corner thereof. A rack 84 is riveted transversely and centrally to the under side of the slidable roof section 74, and in cooperation with the pivotally mounted catch 86 on the roof section operable by the hunter controls the different positions of the slidable roof section with respect to its stationary roof section.

A substantially U-shaped curtain frame 88 has its arms extending in the rear upper portion of the erected blind and the free inner ends thereof are removable pivoted to and in spaced relation to the panels 46 and 58 adjacent the rear upper corners thereof by means of a bolt and nut connection. The arms of the curtain frame are bent at right angles outwardly substantially adjacent the front portion of the upper part of the panels 46 and 58 and then in reverse at right angles so that the outside portion of the arms are slightly spaced from the vertical plane of the panel 44 and the door 50. Also the arms of the curtain frame are of such length as clearly shown in FIG. 3, that the bight portion of the frame, when the frame is in its lowermost position lies in a vertical plane in front of the vertical plane of the front panels of the blind.

Referring now to FIGS. 2, 3 and 4, a rectangular shaped camouflaged curtain or screen of any suitable texture which the hunter can see through is provided with a wide upper hem 87 through which the outer arms and bight portion of the curtain frame are run, the curtain being trained therearound with the lower edge of the curtain being secured to the upper edges of the front panels 38 and 40 by means of the removable strips 90. Similarly the lower portion of the curtain 89 is removably secured to the upper edge of the side panel 44. The lower portion of the curtain is slit adjacent the upper part of the door hinge and it extends downwardly adjacent the inside of the door 45 and is removably and slidably held there against by any suitable means not shown. This provides for the free opening and closing of the door 45 simply by pushing the lower part of the curtain 89 inwardly. The height of the camouflaged curtain is such that when the curtain rod is raised to its uppermost position, the curtain 89 is in a substantially taut condition. The upper hem 87 is also of such a width that it projects upwardly from the bight portion of the curtain rod a sufficient height in the raised position of the rod to hide the leading edge of the slidable roof section 74 when it is in its extended position.

To facilitate the packing of the curtain frame and curtain in the carrying case the inner arms of the frame may be broken by means of any well known pivotal connection such as shown in FIGS. 9 and 10. The arms are held in their erected operative position by means of the screw threaded ferrule.

At this point, it is thought advisable although because of clarity not shown in the drawings, to call attention to the fact that the base, the hinged panels forming the ends and side walls and the roof sections of the blind may if so desired by painting, silk screening or otherwise as in the case of the curtain be completely camouflaged.

As shown in FIG. 1 and in detail in FIGS. 13 and 14 each inner portion of the curtain arm adjacent the pivotal connection has a substantially key hole shaped slot extending vertically therethrough. That is to say the key hole shaped slot comprises a relatively narrow forward portion 90 longitudinally of the arm, merging with a larger rearwardly extending substantially circular shaped opening 92.

Pulleys 94 are rotatably mounted on shafts in a bearing 96 secured to the roof panel adjacent the leading edge of the stationary roof panel 66 and in spaced relation from each side edge of the roof panel, the roof being provided with a pulley receiving slot therein so that the upper and lower portions of the pulleys project above and below the roof panel. It is important to observe that the pulleys are arranged in the stationary roof panel at a point susbtantially above the key hole slot in the arms.

The curtain frame operating cords 100 after the blind is erected are trained over and around the rear portion of each pulley and maintained in operation in the pulley groove by means of the guard 98. The outer ends of each of the operating cords 100 are removably secured to the flange of the leading front edge of the slidable roof section 74 through a hole therein and by means of a knot 102 or the like as shown in FIGS. 3 and 4. The depending portion of the operating cord from the rear of the pulley when the slidable roof section 74 is in its retracted position is threaded vertically downward through the narrow portion 90 of the key hole slot. A resilient section 106 of rubber or the like has one end connected to the free end of the cord 100 and its other end is removably connected by any suitable means to the inner sides of the panels 46 and 58.

Referring now to FIG. 3 it will be apparent that when the slidable roof section 74 is in its retracted position the curtain frame 88 is freely movable upwardly and downwardly to its upper and lower limits. The operating cords 100 extending through the narrow slots of the key hole shaped openings in the inner arms being just taut and stationary permits of the free up and down movement of the curtain frame.

As clearly illustrated in FIGS. 3 and 4 the resilient portion of the cords 100 are larger in horizontal cross section than the cords at their points of connection therewith defining shoulders 108. These shoulders 108 when brought into engagement with the lower portions of the arms 88 will not pass through the narrow slots but are of such a size that they will easily pass through the larger openings of the key hole slots. These shoulders 108 are formed at a position below the arms 88 whereby when the slidable roof section 74 is moved forwardly by the hunter, the travel of the cord thereby will raise the shoulders 108 bringing them into raising engagement with the lower portions of the inner arms of the curtain frame to move the curtain frame 88 upwardly. The shoulders 108 are so positioned on the operating cords 100 that when the slidable roof section 74 has reached its foremost extended position the curtain frame has simultaneously reached its uppermost raised limit, the slidable roof completely covering the top portion of the blind and the camouflaged curtain being raised to form a complete closure of the shooting opening of the blind, with the hem portion of the curtain concealing the outer edges of the slidable roof section. Obviously if so desired any type of an arm raising shoulder could be secured or fixed to the cord.

The curtain and slidable roof may be maintained in this completely raised and extended position by the engagement of the cooperating pivotal catch 85 in the most rearwardly positioned slot of the rack 84.

In these completely closed positions of the camouflaged curtain and the slidable roof section the hunter or hunters may comfortably sit, entirely concealed and camouflaged from the ducks and shielded from the wind and the elements, and look through the porous raised camouflaged curtain and anxiously await the arrival of their anticipated and unsuspecting game. When that crucial second arrives, that being only appreciated by an experienced hunter, action is of the essence and every split second counts. Herein is where one of the most important features of this invention resides, namely, without detection by the sighted game the hunter may through the quiet, simple and quick operation of the operating catch 86 release the slidable roof from its extended position whereby it simultaneously moves backward to its open retracted positioned the curtain moving completely downward to its open position. The hunter or hunters then have available to them from within the blind through the shooting opening, 360° of horizontal shooting as well as complete coverage from above.

Attention is now directed to FIGS. 3, 11 and 12 wherein there is shown the structure for what might be termed the "free wheeling" action or operation of the slidable roof and the curtain frame. On the inner sides of the panels 46 and 58 in spaced relation rearwardly of the normal vertical position of the operating cords 100 there are secured inwardly projecting rollers 112 over which the operating cords 100 are pulled and thereby held in place when the "free wheeling" action is desired. The cords 100, when in this position, are in the large circular portion 92 of the key hole shaped slot as distinguished from its former operative position in the narrow portion 90 of the key hole shaped slot. Thus it will be apparent that the arm operating shoulder 108 or any other adjustable arm lifting means secured to the cord is freely slidable through the larger opening 92 and permits of the free independent movement of either the slidable roof section or the pivotally mounted curtain frame.

This is another very important feature of the invention and one that duck hunters will most appreciate. It permits of the independent complete raising of the curtain frame to its camouflaged position and the same may be removably held in this position by means of the operating mechanism shown in FIGS. 15 and 16.

In these figures there is shown a pair of laterally extending levers 116 which are slidable in supports 118 secured to the inner side of the roof panel 66. The inner ends of the levers are diametrically and pivotally connected to an operating link 120 which is actuated by the rotation of the handle 122. The outer free ends of the levers 120 are curved to the configuration of the inner arms of the curtain frames and when the levers are moved to their outer positions the inner arms of the curtain in its highest position rests therein holding the curtain in its raised camouflaged position.

When the curtain is in this position it will be seen that the independent "free wheeling" movement of the slidable roof section permits of the hunter or hunters to position the roof completely closed, completely open, or in several open adjusted positions through the medium of the rack 84 and its cooperating latch 86.

In this raised hunting position of the curtain blind with the slidable roof section disposed in any of the aforementioned adjusted desired positions, a quick snap action release and falling of the curtain to its open shooting position may be effected by the simple turning of the operating handle 122 to disengage the levers.

Conditions or circumstances may be such that it is desirable to have the slidable roof in different open positions and also to have the camouflaged curtain releasably supported in different raised positions. This is accomplished by, as clearly shown in FIGS. 11 and 12, providing spaced pivotally mounted curtain frame arm receiving hooks or catches 128 on the inner side of the vertical flange of the panels 46 and 58. These hooks or catches 128 normally hang by their own weight vertically downward in an out of the way position.

This blind may be erected and left in position on a particular hunting site for the season or quickly and easily folded and carried to another site or transported home for safe keeping until another day of hunting.

The blind can be quickly dismantled by the simple operation of disconnecting the operating cords, folding the curtain frame, removing the roof in its retracted position, unbolting the angle corners and base, and removing, folding and nesting the panels which formed the walls of the blind. The U-shaped side sections of the base are vertically positioned and tied together by the angle corner members forming the carrying frame. The aforementioned folded parts and the roof section snugly fit in the carrying frame and upon the attachment of the handle there is provided a light weight, compact portable hunting blind that may be carried and transported to and from the hunting site for erection thereon.

This disclosure explains the principles of the invention and the best mode contemplated in applying them, so as to distinguish the invention from others; and there is particularly pointed out and distinctly claimed the part, improvement or combination constituting this discovery as understood by a comparison thereof with the prior art.

What is claimed is:

1. A portable hunting blind comprising a foldable base, hingedly connected a foldable unit including upstanding side and end walls, said unit in its vertical unfolded position being adapted to be removably secured to the base in the unfolded position of the base, one side wall and a portion of each end wall having a continuous shooting opening therein, a removable retractable roof mounted on the upper portion of the walls, a movable closure curtain for the shooting opening, and means operable by the retraction of said roof for simultaneously operating said curtain to open said shooting opening.

2. A portable hunting blind comprising a base, hingedly connected a foldable unit including upstanding side and end walls, said unit in its vertical unfolded position to be removably secured to the base, one side wall and a portion of each end wall having a shooting opening therein, a removable roof on the upper portion of the walls having a retractable section for providing in the roof in its retracted position a shooting opening adjacent the other shooting opening, a movable curtain for opening and closing the shooting opening in the side and end walls, and means operable by the retraction of the roof section for simultaneously operating the curtain to open and close its shooting opening.

3. A portable hunting blind comprising a foldable base, vertical, front rear and end walls secured to said base in its unfolded position composed of vertically hinged panels which may be folded into a unit package form and removed from said base, the front wall being provided with a shooting opening therein, a rearwardly and downwardly slanting removable roof on the rear and end walls having a retractible section for providing in the front portion of the roof in its retracted position a shooting opening therein, and a movable curtain for opening and closing the shooting opening in the front wall, and means operable by the retraction of said roof section for simultaneously operating said curtain to open said shooting opening.

4. A portable hunting blind comprising a foldable base, vertical, front rear and end walls secured to said base in its unfolded position composed of vertically hinged panels which may be folded into a unit package form and removed from said base, the front wall being provided with a shooting opening therein, a rearwardly and downwardly slanting removable roof on the rear and end walls having a retractible section for providing in the front portion of the roof in its retracted position a shooting opening therein, and a movable curtain for opening and closing the shooting opening in the front wall and means operable upon the retraction of the roof section for simultaneously operating the curtain to open and close its shooting opening in the front wall.

5. A portable hunting blind comprising a foldable base having foldable side portions adapted to be folded vertically to form a carrying frame, a removable carrying handle for said carrying frame, vertical, front rear and end walls removably secured to said base in its unfolded position composed of vertically hinged panels which may in the portable form be folded into a unit package and carried in the carrying frame, the front wall being provided with a shooting opening therein, a rearwardly and downwardly slanting removable roof on the rear and end walls having a retractible section for providing in the front portion of the roof in its retracted position a shooting opening therein, and a removable pivotally mounted curtain for opening and closing the shooting opening in the front wall, said roof section and curtain being receivable in the carrying frame formed from the foldable base.

6. A portable hunting blind comprising a foldable base having foldable side portions adapted to be folded vertically to form a carrying frame, a removable carrying handle for said carrying frame, vertical, front rear and end walls removably secured to said base in its unfolded position composed of vertically hinged panels which may be folded into a unit package form when removed from the base and carried in the carrying frame, the front wall being provided with a shooting opening therein, a rearwardly and downwardly slanting removable roof on the rear and end walls having a retractible section for providing in the front portion of the roof in its retracted position a shooting opening therein contiguous with the other opening, and a removable pivotally mounted curtain for opening and closing the shooting opening in the front wall and means operable upon the retraction of the roof section for simultaneously operating the curtain to open and close its shooting opening in the front wall, said roof section and curtain being receivable in the carrying frame provided from the foldable base.

7. A portable hunting blind comprising a foldable rectangular shaped base including having pivoted U-shaped end members adapted to be positioned upwardly in spaced relation to form a carrying frame, vertical, front rear and end walls removably secured to said base in its unfolded position composed of vertically hinged panels and a door which may be folded into a unit package form when removed from the base and carried in the carrying frame, the front and end walls having a contiguous shooting opening therein, a rearwardly and downwardly slanting roof on the rear and end walls having a retractable section for providing in the front portion of the roof in its retracted position a shooting opening therein contiguous with the other opening, and a removable pivotally mounted curtain for opening and closing the shooting opening in the front and end walls, and means operable upon the retraction of the roof section for simultaneously operating the pivotally mounted curtain to open the shooting opening in the front and end walls.

8. A portable hunting blind comprising a foldable rectangular shaped base having pivoted U-shaped end members adapted to be positioned upwardly in spaced relation to form a carrying frame, vertical, front rear and end walls removably secured to said base in its unfolded position composed of vertically hinged panels and a door which may be folded into a unit package form when removed from the base and carried in the carrying frame, the front and end walls having a contiguous shooting opening therein, a rearwardly and downwardly slanting roof on the rear and end walls having a retractable section for providing in the front portion of the roof in its retracted position a shooting opening therein contiguous with the other opening, and a removable pivotally mounted curtain for opening and closing the shooting opening in the front and end walls, and means operable upon the retraction of the roof section for simultaneously operating the pivotally mounted curtain to open the shooting opening in the front and end walls, and a pair of corner angle members removably secured to the corners of the front wall and adapted to be removed and secured to the foldable vertical members of the carrying frame together in their folded position to tie them together, said roof section and curtain being receivable in the carrying frame and a removable carrying handle secured to the carrying frame.

9. A portable blind comprising a rectangular shaped base having the side portions pivoted to be moved vertically in position to form a carrying frame, vertical front rear and end walls removably secured to said base in its extended position composed of vertically hinged panels and a door which may be folded into a package form when removed from the base and carried in the carrying frame, the front and end walls having a contiguous shooting opening therein, a rearwardly and downwardly slanting roof on the rear and end walls having a retractible section for providing in the front portion of the roof in its retracted position a shooting opening therein contiguous with the other shooting opening, a removable foldable curtain carrying frame pivotally secured to the end walls for opening and closing the shooting opening in the front and end walls and means connected to the retractible roof section and the curtain carrying frame for simultaneously operating the curtain frame to open the shooting opening in the front and end walls upon the retracting of the roof section.

10. A portable blind comprising a rectangular shaped base having the side portions pivoted to be moved vertically in position to form a carrying frame, vertical front rear and end walls removably secured to said base in its extended position composed of vertically hinged panels and a door which may be folded into a package form when removed from the base and carried in the carrying frame, the front and end walls having a contiguous shooting opening therein, a rearwardly and downwardly slanting roof on the rear and end walls having a retractible section for providing in the front portion of the roof in its retracted position a shooting opening therein contiguous with the other shooting opening, a removable foldable curtain carrying frame pivotally secured to the end walls for opening and closing the shooting opening in the front and end walls, means connected to the retractible roof section and the curtain carrying frame for simultaneously operating the curtain frame to open the shooting opening in the front and end walls upon the retracting of the roof section, means operable upon the retraction of the roof section for simultaneously operating the pivotally mounted curtain carrying frame to open the shooting opening in the front and end walls, means for removably securing the retracted section in different opened positions, and means for removably securing the curtain frame in different positions independently of the position of the movement and position of the retractible section of the roof, said roof section, foldable curtain frame and folded package panel form being receivable in the carrying frame and a carrying handle for the carrying frame.

References Cited in the file of this patent

UNITED STATES PATENTS

| | | |
|---|---|---|
| 510,427 | Hine | Dec. 12, 1893 |
| 912,084 | Davidson | Feb. 9, 1909 |
| 912,849 | Hultgreen | Feb. 16, 1909 |
| 2,837,777 | White | June 10, 1958 |
| 2,883,713 | Zug | Apr. 28, 1959 |